(12) United States Patent
Gandhi et al.

(10) Patent No.: US 11,809,819 B2
(45) Date of Patent: *Nov. 7, 2023

(54) AUTOMATED FORM GENERATION SYSTEM

(71) Applicant: Adobe Inc., San Jose, CA (US)

(72) Inventors: Mandeep Gandhi, Noida (IN); Suvrat Chaturvedi, Noida (IN); Deepak Kumar, Noida (IN)

(73) Assignee: Adobe Inc., San Jose, CA (US)

( * ) Notice: Subject to any disclaimer, the term of this patent is extended or adjusted under 35 U.S.C. 154(b) by 58 days.

This patent is subject to a terminal disclaimer.

(21) Appl. No.: 17/507,679

(22) Filed: Oct. 21, 2021

(65) Prior Publication Data

US 2022/0043970 A1    Feb. 10, 2022

Related U.S. Application Data

(63) Continuation of application No. 15/816,689, filed on Nov. 17, 2017, now Pat. No. 11,182,547.

(51) Int. Cl.
   *G06F 40/186*     (2020.01)
   *G06F 40/174*     (2020.01)
   (Continued)

(52) U.S. Cl.
   CPC ............ *G06F 40/186* (2020.01); *G06F 3/048* (2013.01); *G06F 16/211* (2019.01);
   (Continued)

(58) Field of Classification Search
None
See application file for complete search history.

(56) References Cited

U.S. PATENT DOCUMENTS 9,928,230 B1    3/2018   Jain et al.
2002/0146170 A1*   10/2002   Rom .................. G06V 30/416
                                                                               382/175

(Continued)

OTHER PUBLICATIONS

Strmečki, Daniel & Radosevic, Danijel & Magdalenić, Ivan, "Web form generators design model", researchgate publication 283636912, pp. 1-7. (Year: 2015).*

(Continued)

*Primary Examiner* — Ariel Mercado
(74) *Attorney, Agent, or Firm* — Shook, Hardy & Bacon L.L.P.

(57) ABSTRACT

Various embodiments, methods and systems for implementing a form generation system are provided. Generating forms includes dynamic generation, personalization, and optimization of the forms based on automation objects that instruct on how to construct, structure and present forms for personalized data capture experiences. In operation, a form generator engine receives a request from a computing device to access a form. The form generator engine accesses form generation automation rules that are based on form generation parameters and automation objects. Using form generation automation rules, form generation parameters are used to generate automation objects including an annotated schema, a machine learning model, and a layout. Based on the form generation automation rules the automation objects are used to generate the form such that at least a field or a section of the form is selected based on a relevance score associated with field or section. The form is communicated for display.

20 Claims, 6 Drawing Sheets

(51) Int. Cl.
   *G06N 20/00* (2019.01)
   *G06F 16/21* (2019.01)
   *G06F 3/048* (2013.01)
   *G06N 5/046* (2023.01)
   *G06F 40/106* (2020.01)

(52) U.S. Cl.
   CPC .......... *G06F 40/106* (2020.01); *G06F 40/174* (2020.01); *G06N 5/046* (2013.01); *G06N 20/00* (2019.01)

(56) References Cited

U.S. PATENT DOCUMENTS

| | | | |
|---|---|---|---|
| 2008/0215976 A1* | 9/2008 | Bierner | G06F 40/174 715/708 |
| 2008/0267505 A1 | 10/2008 | Dabet et al. | |
| 2009/0070201 A1 | 3/2009 | Hodges et al. | |
| 2010/0114609 A1 | 5/2010 | Duffy, Jr. et al. | |
| 2011/0131479 A1* | 6/2011 | Padgett | G06F 3/04895 715/777 |
| 2014/0180826 A1 | 6/2014 | Boal | |
| 2016/0117453 A1 | 4/2016 | Cales | |
| 2016/0314109 A1 | 10/2016 | Singh et al. | |
| 2018/0095733 A1 | 4/2018 | Torman et al. | |
| 2018/0143958 A1 | 5/2018 | Kakkad et al. | |

OTHER PUBLICATIONS

Goil, S., et al., "MAFIA: Efficient and Scalable Subspace Clustering for Very Large Data Sets", In Proceedings of the 5th ACM SIGKDD International Conference on Knowledge Discovery and Data Mining, Technical Report No. CPDC-TR-9906-010, pp. 1-20 (Jun. 1999).

Woo, K. G., et al., "FINDIT: a fast and intelligent subspace clustering algorithm using dimension voting", Information and Software Technology, vol. 46, pp. 255-271 (2004).

* cited by examiner

AUTOMATED FORM GENERATION SYSTEM

CROSS-REFERENCE TO RELATED APPLICATIONS

This application is a Continuation of U.S. patent application Ser. No. 15/816,689, filed Nov. 17, 2017, now U.S. Pat. No. 11,182,547, the entire contents of which are incorporated by reference herein.

BACKGROUND

Organizations often capture user information to help provide their goods or services to the user. Capturing user information can be based on data capture experiences that provide electronic data capture forms or electronic forms. Electronic data capture forms commonly are presented via online sites or other types of networked computing environments. For example, an organization may provide an electronic data capture form that supports capturing user information, where the user enters their information into fields of the electronic form.

SUMMARY

Embodiments of the present invention relate to methods, systems and computer storage media for automatically generating data capture forms ("forms"). In particular, generating forms includes dynamic generation, personalization, and optimization of forms based on form generation automation objects ("automation objects") that instruct on how to automatically construct, structure and present forms for data capture experiences. Forms are generated based on specific types of automation objects that include an annotated schema, a machine learning model, and layout templates. The form is automatically generated, personalized and optimized using a form generation system.

In operation, at a high level, a form generator engine receives a request from a computing device to access a form. The form generator engine accesses form generation automation rules that are based on form generation parameters and automation objects for generating the forms. The form generation parameters indicate properties for generating the automation objects and the form. Automation objects support schema annotation, machine learning and layout templates for generating the form. The form generation parameters and automation objects are dynamically generated by or retrieved from components of the form generation system. Form generation parameters can include a set of weights for fields or sections, a set of weighted parameters, device type data, business rules data, a raw schema, user activity data, analytics data, user submission data and user profile data, amongst other form generation parameters, that are used to execute the form generation automation rules. Automation objects can include an annotated schema, a machine learning model, a layout repository of templates, associated with sections, and fields, amongst other elements, that are used to execute the form generation automation rules for generating the form. In particular, the form is generated based on the form generation automation rules, such that at least a field or a section of the form is selected based on a relevance score associated with the field or section. The form is communicated to cause display of the form on the computing device.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter

BRIEF DESCRIPTION OF THE DRAWINGS

The present invention is described in detail below with reference to the attached drawing figures, wherein.

DETAILED DESCRIPTION

Figure 1:
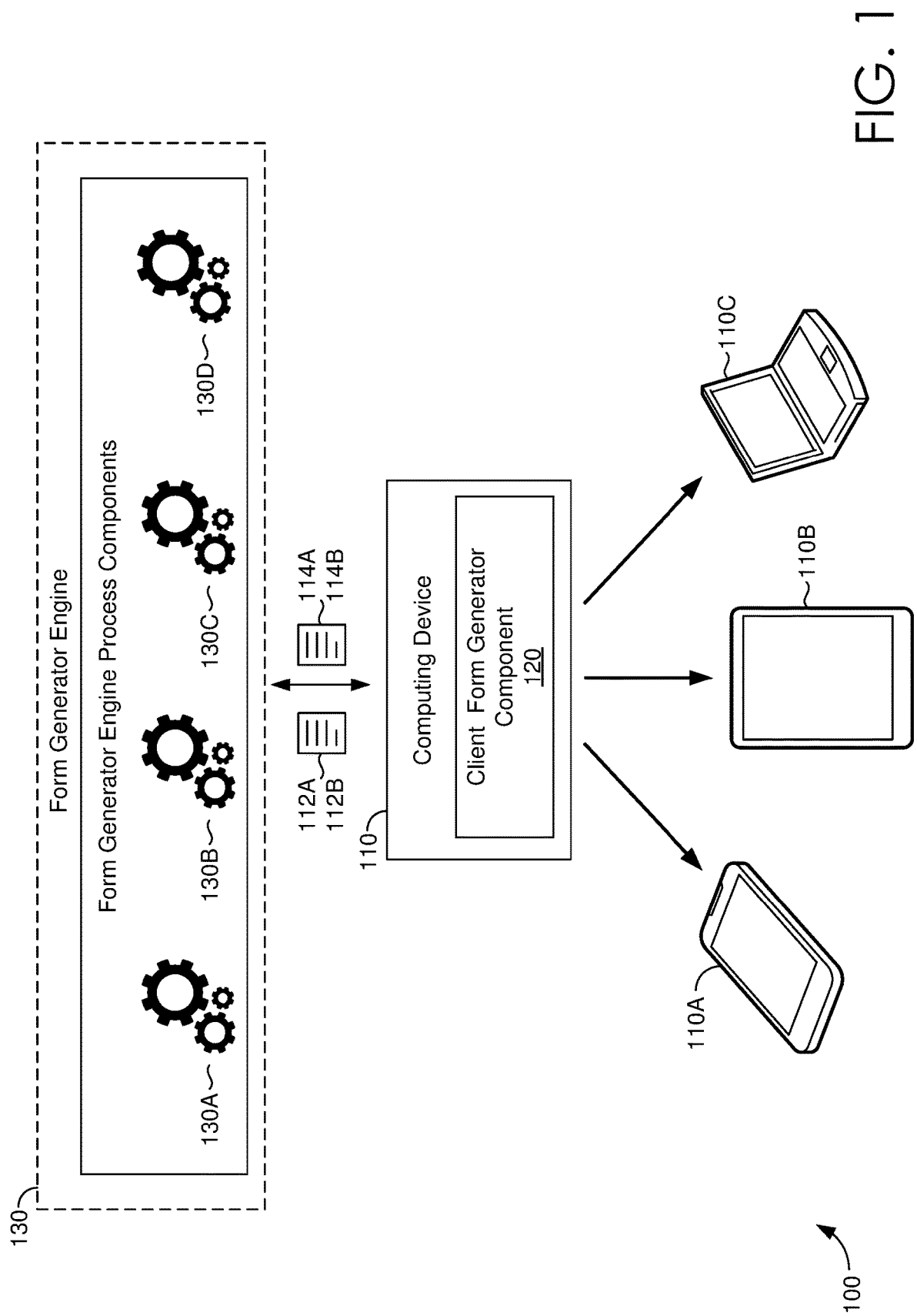
FIG. 1 is a block diagram of an exemplary form generation system in which embodiments described herein may be employed.

Organizations providing goods or services to users often collect information from users. Capturing user information can be based on data capture experiences that provide electronic data capture forms ("electronic forms" or "forms"). Collecting user information can be useful for converting users into paying customers or gathering user information from users to provide services. Such data capture experiences in some instances may require filling out forms having several different sections, each section having different fields for capturing different types of user information. For example, a user filling out a form application, while applying for a credit card from a banking organization, may have to fill out a section on personal information and another section on financial history, so that the banking organization can then process the credit card application. The particular information requested from the user can also vary based on the user. For example, if the user is below a certain age, the user may require a co-applicant on the credit card application and as such additional sections and fields are provided for receiving the user information.

By way of background, a data capture form ("form") can refer to an electronic form. A form can be associated with a data capture experience. As part of a data capture experience, the form can be generated based on design requirements that are characteristics and features of the form that define how the form is constructed, structured and presented as part of the data capture experience. Design requirements can conventionally include a form schema, layouts, sections and fields of the form, and graphical control elements. A section of the electronic form can include fields, where a section is a logical grouping of fields. For example, an address section can include street, city, state and zip code as fields. A fragment of the form can refer to one or more sections of the form. Fragments can be defined and reused across forms. For example, a "person fragment" can include both a personal information section (e.g., first name, middle name, and last name) in combination with an address section.

The form schema of the form can be formally or programmatically defined. For example, a form schema designer and/or data capture experience designer constructs a layout, sections, fields in a formal language or design definition in order to capture or receive particular user information from a user entering the information into an electronic form. An application developer can access the design requirements to develop specific types of data capture experiences in different forms. Form field values ("user input" or "user information") can refer to information entered by a user into the form. The user can be a target audience for the form or a participant in a particular activity associated with the form.

Organizations that use data capture experiences intend on making user conversions (i.e., achieve the desired intent for the data capture experience) using the forms. For example, during a data capture experience, a user is presented with a form, such that the user is converted, when the user enters input that is captured via the form. A conversion ratio is based on a number of users that filled the form compared to a total number of users to whom the form was presented to. These organizations face several challenges when attempting to capture user information from data capture experiences. Challenges can be experienced based on the amount of user information to be captured, different types of computing devices, and frequent changes in the type of user information to be captured.

By way of example, when there exists a significant amount of user information to be captured, forms and data capture experiences have to be designed so that the user is not frustrated or hindered from entering their information because they have a lot of information to be entered into the form. Several fields or sections of the form can at times be inapplicable to a user based on user input into other parts of the form. Also, when there are different varieties of computing devices having different capabilities for processing data capture experiences, the user experience has to be at least consistent or convenient on the different computing devices. Further, when the type of user information to be captured changes frequently because of external influences or business priorities, alterations have to be made in a timely manner in order to capture the proper user information.

Conventional technologies and tools are limited in providing solutions to the above-described challenges. Conventionally, manual form development processes and personnel are used to design and create different types of data capture experiences for forms. For example, an organization can create a list of requirements for data capture experiences, a form schema designer uses the requirements to design a form schema. A data capture experience designer then generates mocks of the look and feel of the data capture experience and specifically how the form would look when presented. The data capture experience designer can additionally define the look of the form on specific computing devices, such as a mobile phone or tablet.

Application developers and form authors receive input information (e.g., form schema) from a form schema designer and translate form schemas into data capture experiences that can be communicated to a user in an electronic form. Application developers and form authors often implement manually intensive workflows to fully develop data capture experiences. For example, an application developer can use an application development language to develop the electronic forms based on the mocks and form schema.

However, the application developer has to manually define different types or versions of an electronic form, as needed to get different types of user information. The application developer can optionally develop different types of electronic forms for different types of computing devices, or at times the application developer takes a "one form fits all approach." In this regard, for different types of form developers and authors, the forms can be built tediously to make them adaptive; nonetheless they are still relatively static, in that, the electronic form is exactly the same for each user. Overall, the manual development process and the conventional static forms make for less than ideal data capture experiences for users, which can limit conversion of users. As such, a comprehensive system that addresses the challenges identified above would improve the data capture experience development for organizations and the user experience.

Embodiments of the present invention relate to methods, systems and computer storage media for automatically generating data capture forms ("forms"). In particular, generating forms includes dynamic generation, personalization, and optimization of forms based on form generation automation objects ("automation objects") that instruct on how to automatically construct, structure and present forms and data capture experiences. Forms are generated based on specific types of automation objects that include an annotated schema, a machine learning model, and layout templates. The form is automatically generated, personalized and optimized using a form generation system.

The form generation system uses schema annotation, a machine learning model, and layout templates in a layout repository, in an integrated system, to automatically generate, combine and communicate forms. For example, a form can be generated and communicated to a client computing device of a user accessing the form and the client computing device can display or cause display of the form that provides a data capture experience. Using form generation automation rules, that are based on form generation parameters and form generation automation objects, the form can be personalized, optimized and provided to be displayed.

In this regard, the form generation parameters refer to properties that are defined, coded or scripted into a set of form generation automation rules that are applied for automatically generating forms. The form generation automation rules can include a first tier of form generation automation rules and a second tier of form generation automation rules. In one exemplary embodiment, first tier form generation rules can simply be offline processing protocols and second tier form generation rules can be online processing protocols. The first tier of form generation automation rules can be defined, coded or scripted as instructions for generating automation objects and the second tier of form generation automation rules can be defined, coded or scripted as instructions for generating a form. The first tier and second tier of form generation automation rules can be executed based on form generation parameters and automation objects respectively. For example, a first tier of form generation automation rules can be associated with generating the annotated schema and the machine learning model as automation objects. In particular, generating the machine learning model can be based on the first tier of form generation automation rules defined using form generation parameters (e.g., user profile, previous submissions, and weighted parameters) such that the values are used in generating the machine learning model. The second tier of form generation automation rules can be associated with generating the form itself as an electronic form. Generating the form can be based on the second tier of form generation automation rules defined using automation objects (i.e., annotated schema, machine learning model, and layout templates). Specific first tier and second tier form generation automation rules are described in more detail below with reference to examples.

With reference to form generation parameters, form generation parameters include: a set of weights for fields or sections, a set of weighted parameters, device type data, business rules data, a raw schema, user activity data, analytics data, user submission data and user profile data, amongst other form generation parameters, that are used to execute the form generation automation rules. Form generation parameters can be used to generate automation objects can be generated offline (e.g., machine learning model) or dynamically online, where the form generation parameters are identified, or accessed from storage. The form generation parameters can be associated with specific components in the form generation system that supports processing form generation parameters for generating the automation objects and the forms.

In operation, at a high level, a form generator engine receives a request from a computing device to access a form. The form generator engine accesses form generation automation rules that are based on form generation parameters and automation objects for generating forms. The form generation automation rules are programmatically defined as code, instructions, or scripts written for a special automated form generation run-time environment to automate the execution of tasks that generate the form. The form generation parameters indicate properties for generating the automation objects and the form. Automation objects support schema annotation, machine learning and layout templates for generation the form. The form generation parameters and automation objects are dynamically generated by or retrieved from components of the form generation system. Form generation parameters are used to execute the form generation automation rules. Automation objects are used to execute the form generation automation rules for generating the form. In particular, the form is generated based on the form generation automation rules, such that at least a field or a section of the form is selected based on a relevance score associated with the field or section. The form is communicated to cause display of the form on the computing device.

The form generation parameters can specifically be used to define, generate, and select automation objects (e.g., schema annotation, machine learning models, layout templates associated with graphical control elements, fragments, sections and fields). Some processing of form generation parameters to generate automation objects can be done offline (e.g., generating the machine learning model). The components of the form generation system are associated with generating, providing or accessing specific automation objects for the form. For example, an annotated schema generator generates an annotated schema based at least in part on the raw schema and the set of weights of fields and sections. The weights of fields or sections, as quantified in the annotated schema relevance score, can be based on a business value assessment. For example, the raw schema can contain a first name, a last name and a middle name field and the business rules data may be used to annotate higher weights to the first name and last name and a lower weight to a middle name field. In another example, during an annotation process, a first section in the raw schema can be weighted, based on business rules data, the first section is weighted higher than a second section based on a quantified weight of the all the fields within the section. By way of analogy, the raw schema provides the universe of defined sections and fields and the annotated schema generator proactively annotates sections and fields based on form generation parameters (e.g., weighted fields, business rules data, and user activity data and analytics data) and with additional annotated data that provide instructions on how the annotated schema can be used to generate the form. The annotated schema is then used as input into the machine learning model generator. The raw schema can include a first of set of fields or sections that are annotated into a second set of fields or sections in the annotated schema. In one exemplary implementation, the annotated schema is generated based on business rules and updates to business rules. For example, a business rule may require only a first name, last name and optional middle initial; however an update to the business rule may require all three, as such a raw schema can be annotated depending on the applicable business rule and can flexibly be updated from one rule to another. In other words, upon updating the first set of business rules into a second set of business rules (or updated set of business rules), the first set of fields or sections can be dynamically annotated into a newly annotated second set of fields or sections in the annotated schema. The new second set of fields or sections of the annotated schema are associated with the second set of business rules. In this regard, at a first time, an annotated schema can have a set of fields or sections from the raw schema annotated using the first set of business rules, and at a second time, the annotated schema can have the set of fields or sections from the raw schema annotated using the second set of business rules.

The annotated schema is generated to contain relevant fields or sections (e.g., a personal information section) having relevance scores ("annotated schema relevance score") based on weights of fields. The relevant score in the annotated schema indicate how relevant a field is to the business as the weights of fields are identified by business rules data. The raw schema can include fields for user information to be captured, such as personal information and address information and how that information is programmatically represented. For example, an Extensible Markup Language (XML) can be used to define the raw schema and then the annotated form schema. The raw schema can also be programmatically and dynamically annotated to represent business rules data, validation data and dependency data between data fields. For example, a "service eligibility" field can depend on "annual income" or a "rental car information" section can depend on the "age" of the user because of business rules data.

The raw schema can also be annotated into an annotated schema to associate fields and sections with user information from previous user activity data or analytics data that can be used to make additional decisions in generating the form. The annotations using the user activity data and the analytics data can also be programmatically executed. In one exemplary implementation, an annotated schema is generated based on a first set of fields or sections in the raw schema that are annotated into an annotated second set of fields or sections in the annotated schema. An annotated schema supports defining an annotated relevance score for fields or sections in the annotated schema or selecting a layout template for forms. For example, the form generation system can skip serving a particular section when user information already exists for the fields or based on user activity data and analytics data in the annotated schema, the form generation system can skip serving a section when a previous similarly situated user did not fill the section. In another example, the form generator engine system may automatically offer assistance to a user for a field or section where users have been known to have trouble with (e.g., validation errors above a defined threshold).

The machine learning model generator generates a machine learning model that is used to support automatically generating the form. The machine learning model uses algorithms that can learn to make predictions on data in order to make data-driven predictions and decisions. The model can be built to make predictions on relevant fields or sections and probable values of specific fields (i.e., auto-fill or auto-suggestion functionality) based on form generation parameters. In this regard, the machine learning model generator component also includes automation functions values (i.e., values for auto-fill function or auto-suggest function). Given data from all user submission data and weighted parameters, the machine learning model generator generates a model that can receive the annotated schema, user profile data (which can include demographic data) and user submission data to provide a set of probable values for some of the fields and the relevance score of each field or section.

Several different types of machine learning algorithms and techniques (data clustering, linear regression, polynomial regression, etc.) are contemplated with embodiments of this invention. At a high level a selected machine learning algorithm operates to determine a relevance score for fields of a form and determine default values (e.g., autofill or auto-suggest values) for fields. For example, a first user and a second user may share similar demographic attributes such that, if the first user fills or skips a set of fields for a selected form, for the second user, based on the first user activity data, a relevance score for the set of fields can be determined and referenced when generating the selected form. The machine learning model generator applies the algorithm to generate the machine learning model, the machine learning model is used to generate relevance scores ("machine learning relevance score") for fields and sections of the form and at least a subset of the sections or fields are selected for presentation based on the relevance scores. The relevance score in the model indicates how relevant the field or section would be to the user. Advantageously, section relevance scores operate such that sections are prioritized for presentation based on the sum of the relevance scores of fields within the section. A business rule may further define a threshold relevance score for providing a field or section to the user.

A machine learning model generator can operate to make predictions of values based on user submission data and user profile data. In operation, the machine learning model generator accesses user profile data, demographic data and user submission data ("dataset"). For example, location, gender, age group, income category, marital status, etc. In particular, user profile data include attributes that are unique to a particular individual and demographic data include attributes that are common to a segment of users. User submission data can refer to previous submission data that not only includes data submitted by a user but also may include data submissions of a plurality of user that have filled a particular form. It is contemplated that "previous submission data" "past submission data" and "past submission history" may be used paradigmatically. The accessed dataset can be used to intelligently predict default values for fields. The scores for fields in a section are then used to calculate the relevance score for that particular section. In one embodiment, the user profile data and the user submission data can be organized (e.g., stitched) for easy lookup in a single database.

The dataset can be processed using different types of machine learning tools. In operation, the dataset can be transformed to facilitate data clustering. For example, number data items can be transformed into ranges, and strings can be analyzed to determine their semantic meaning. Additionally, using natural language processing techniques, some dataset values can be replaced with new related values to provide the essential meaning of the values in the dataset, removal of unique attributes pertaining to the end users etc. Other variations and combination of transforms are contemplated with embodiments described herein. As discussed in more detail below, the dataset and data clustering techniques can be used to support making predications on values based on the dataset.

In an exemplary embodiment, one technique for deriving meaningful information from data is data clustering, which can be executed on the dataset to generate scores for high dimensional data. In operation, the transformed dataset is received as input to execute a clustering algorithm. The clustering algorithm operates to segment the users according to the user profile data and data attributes (i.e., fields of the form). Dimensions of data associated with the transformed dataset are determined or reduced and the dataset is clustered. The clustered dataset is utilized in making predictions for values of fields in sections of the form, advantageously at the time when the form is generated. The parameters for each new user can be used as input to process against the cluster dataset. The parameters and cluster dataset are used to predict values based on determining the proximity of the user to a cluster and deriving values to the proximate cluster. The parameters can include user profile data, user demographic data, and form fields values the user has entered in previous fields or sections of the form during the session.

By way of example, when a form request is received from a user, the known attributes of the user profile data and demographic data can be used to identify a cluster which matches the given user. Upon identifying the cluster, values from the cluster can be used as predictors or default values to fill the form associated with the user. Several different strategies can be adopted to extract values from an identified cluster of the cluster dataset. For example, a mean value or a mode value can be determined for certain types of values in the identified cluster and the calculated mean or mode can be used as a default value.

The machine learning model generator further supports generating relevance scores. At a high level, the form generation system operates to provide the most relevant fields to the user in the form that is generated and provided for display. Presenting the most relevant fields in part includes hiding irrelevant fields and sections and presenting fields in a customized order. As such, a relevance score is associated with each field. The relevance score ("machine learning relevance score") can be a mathematical function based on a confidence score, a business importance score (e.g., annotated schema score) and a dependency score of a field. The mathematical function is shown below:

Score of field $x_i$=

$$f(c(\text{confidence}), b(\text{business\_relevance}), d(\text{dependence\_rank})) = Kc + Mb + Nd$$

In function above, K, M, N are constants. Confidence of the field $x_i$=(Total number of fields with the predicted value/Total number of rows of data). Business_relevance of the field $x_i$=A*Number of rules in field+f(mandatory) where A=constant, f(mandatory)=1 if $x_i$ is mandatory else 0.1.

Dependence_rank=B*Σbusiness_relevance*f(mandatory) where Σ is the summation of all dependent fields of $x_i$, where B=constant.

For every data attribute (e.g., column data) the machine learning model generator can output the default value of the field and its associated relevance score. It is contemplated that different strategies, such as aggregation of such scores across sections, can decide the relevance of sections. In addition, depending on whether the form field value is a unique attribute or a value that should be predicted by the model, the form is generated based the specific type of field. Other machine learning models (e.g., logistic regression, multinomial regression, linear regression) can be used to predict values and provide corresponding scores for fields as discussed above.

The layout repository stores and provides different layout templates. A layout includes multiple widgets, graphical controls and layout ordering features that support providing a data capture experience. The layout of the data capture experience can be dynamically generated or identified based on form generation parameters and user information (e.g., current session user inputs) to provide the user with a tailored experience. The layout repository can be updated with information based on analytics data. For example, layouts that have been associated with more conversions might be associated with a higher relevance score (i.e., layout relevance score) such that the particular layout has a higher likelihood to be selected compared to other layouts that have lower relevance score. In this regard, a layout for a section that led to a conversion would increase the likelihood that the same layout would be selected for a subsequent section. In addition, fields in a layout can be associated with properties that are referenced and used when generating the field in the form. Field properties can be based on analytics data, user activity data and other identified data tracked for the particular field. Actions of previous users who have used a field in a selected form can be used to define a property for the field. For example, based on analytics data, a layout can have a field defined with a property that indicates "always show help" because of a high error rate identified from other users when filling the field or an average time taken to fill the field. Other variations and combination of properties for fields are contemplated with embodiments described herein.

The layout repository can be part of the broader capacity for the form generator engine system to support device-based optimization, where the form is generated based in part on the specific computing device the user is operating. For example, a user on a mobile phone, tablet, laptop or desktop can have their layout or graphical control elements dynamically generated based on their computing device. In another embodiment, the form can also be presented in selectable sections or fragments for improved presentation and interaction by the user. By way of example, the selected layout template can be based on a determined best fit number of fields to be presented to the user based on the device display characteristics. Further, graphical control elements (e.g., radio button, dropdown, scroll, etc.) associated with the layout templates can also be selected based on the user's computing device.

The form generation system operates to access the form generation automation rules (e.g., the second tier of form generation automation rules) and use the automation objects to generate the form. In particular, the form generator engine can access embedded rules (e.g., annotated form schema) or explicit rules (e.g., rules engine) that are scripted or coded as instructions to generate the form. For example, using processing the annotated form schema through the machine learning model, relevant sections above a relevance threshold can be selected to generate the form. Also, automated function values, identified based on the machine learning model, are presented as part of the form.

The form generation system can also further dynamically generate the form based on personalization and optimization, via one or more form generation iterations, based on current session user information. The current session user information can be used to determine how to present sections of the form to the user. For example, selecting a layout template can be based, at least in part, on current session user information associated with the fields, or the relevance score for a section can be refined based on user activity or analytics. Based on user information received during a current session, form generation actions can be taken to dynamically update how the form is presented. The form is generated based on the form generation parameters and automation objects and communicated to the computing device. The user of the computing device can access a personalized, optimized and automatically generated form.

Advantageously, this invention alleviates the hardship associated with complex development cycles for data capture experiences with automated, dynamic, personalized and optimized form generation system. In particular, the form generation system leverages machine learning to gain additional insights into potential user information, intent and actions. For example, a basic credit card request form, based on embodiments of the present invention, can be generated based on deductions from the machine learning model. With the machine learning model, if the user is from an urban area and within the 35-55 age range, the user can be automatically presented with additional options to upgrade the credit card form to a premium credit card request form. Another user, who does not meet the same requirements, would not automatically have the basic credit card request form updated to the premium credit card request form.

The form generation system uses a set of unconventional rules (i.e., sets of form generation automation rules) to automate the generation of forms. In particular, the set of rules are associated with form generation parameters (i.e., first tier rules) and automation objects (i.e., second tier rules). The selected defined set of rules prevents broad preemption of all rules for automated form generation. The form generation system further provides for a specific improvement to the operation of the conventional form generation systems and for generation technology, in that, electronic forms can be dynamically generated instead of relying on conventional technology static forms. For example, only the most relevant portions of forms may be computed, identified, and communicated to a user, as such limiting the computing resources based on dynamic portions of the forms compared to overly broad computing processing of irrelevant portions of the form that are not applicable to the user. Further, the forms can be personalized and optimized based on user activity data and analytics data using the automation objects and the form generation parameters, as described above.

Moreover, the operations for generating dynamic generation, personalization and optimization of forms is not conventional in the technology field and the form generation system addresses a technological problem of manual development of forms by implementing a solution specific to that technological environment. The solution is also different from the manner suggested by routine or conventional use (i.e., static forms) within the field. As such, this invention presents an improvement to the computing operations of data capture generation and an improvement to the overall technology field of generating forms.

With reference to FIG. 1, FIG. 1 illustrates an exemplary form generation system 100 in which implementations of the present disclosure may be employed. In particular, FIG. 1 shows a high level architecture of form generation system 100 having components in accordance with implementations of the present disclosure. It should be understood that this and other arrangements described herein are set forth only as examples. In addition, a system, as used herein, refers to any device, process, or service or combination thereof. A system may be implemented using components or generators as hardware, software, firmware, a special-purpose device, or any combination thereof. A system may be integrated into a single device or it may be distributed over multiple devices. The various components or generators of a system may be co-located or distributed. For example, although discussed for clarity as the content application component, operations discussed can be performed in a distributed manner. The system may be formed from other systems and components thereof. It should be understood that this and other arrangements described herein are set forth only as examples.

Among other components or generators not shown, form generation system 100 includes a computing device 110 having a client form generator component 120. The form generation system 100 also includes form generator engine 130 including a plurality of form generator engine process components (130A, 130B, 130C and 130D). The components of the form generation system 100 may communicate with each other over one or more networks (e.g., public network or virtual private network "VPN"). The network (not shown) may include, without limitation, one or more local area networks (LANs) and/or wide area networks (WANs). The computing device 110 can be a client computing device that corresponds to the computing device described herein with reference to FIG. 6.

The components of the form generation system 100 can operate together to provide functionality for automated, dynamic, personalized and optimized form generation described herein. The form generation system 100 supports forms on the computing device 110. In particular, the computing device 110 includes a client form generator component 120 that operates to process data used for providing data capture experiences. The client form generator component 120 can be part of different types of computing devices (e.g., computing devices 110A, 110B and 110C) each having different capabilities for accessing forms. The client form generator component 120 can receive a request (e.g., request 112A) for a form. For example, a user on the computing device 110 may navigate to a browser application and select a link that operates to communicate a request for a form. The request for the form may automatically include additional information (e.g., different types of form generation input, such as, device type data including device capabilities, associated with generating the form.

The client form generator component 120 can also operate to receive the form from the form generator engine 130. In particular, the form can be received (e.g., form data 114A) and processed at the client form generator component 120. The form can be received based on operations performed at the form generator engine 130, as discussed herein. The form can be received in whole or partially (e.g., 'form fragments) such that a user at the computing device 110 can provide input based on the received portion of the form. The client form generator component 120 also operates to cause display of the form at a display of the computing device 110.

It is contemplated that user information 112B (e.g., current session user information) can be communicated from the client form generator component 120. The user session data can refer to data received as user input after fields, sections, or fragments of a form are communicated to the client form generator component 120. User information can also operate as form generator input data used in dynamically making additional decisions on how to generate the form. As described herein in more detail, specifically current session user information can be iteratively processed in a data capture experience to generate successive form data (e.g., a second portion of the form data 114B) of the form.

The form generator engine 130 is responsible for generating forms. The form generator engine 130 operates with several form generator engine process components (e.g., form generator engine process components 130A, 130B, 130C, and 130D) to automatically and dynamically generates personalized and optimized forms. Form generator engine process components operate to access, identify and generate different types of form generation parameters that are used to make decisions on how to generate the form. At a high level, the form can be generated and communicated based on a request (e.g. request 112A) received from the client form generator component 120 via the computing device 110. The accesses the plurality of form generator engine process components (e.g., form generation automation rules, form generation parameters, and automation objects) and performs operations that support generating forms.

The form generator engine 130 communicates the form (e.g., form data 114A) to the computing device 100, where it is caused to be displayed so that a user enters user information. The form generator engine 130 can also receive user information 112B (e.g., current session user information) from the client form generator component 120 to dynamically make additional decisions on how to generate the form. The form generator engine 130 supports iterative reception of user information to support communicating successive form data (e.g., a second portion of the form data 114B) of the form.

Figure 2:
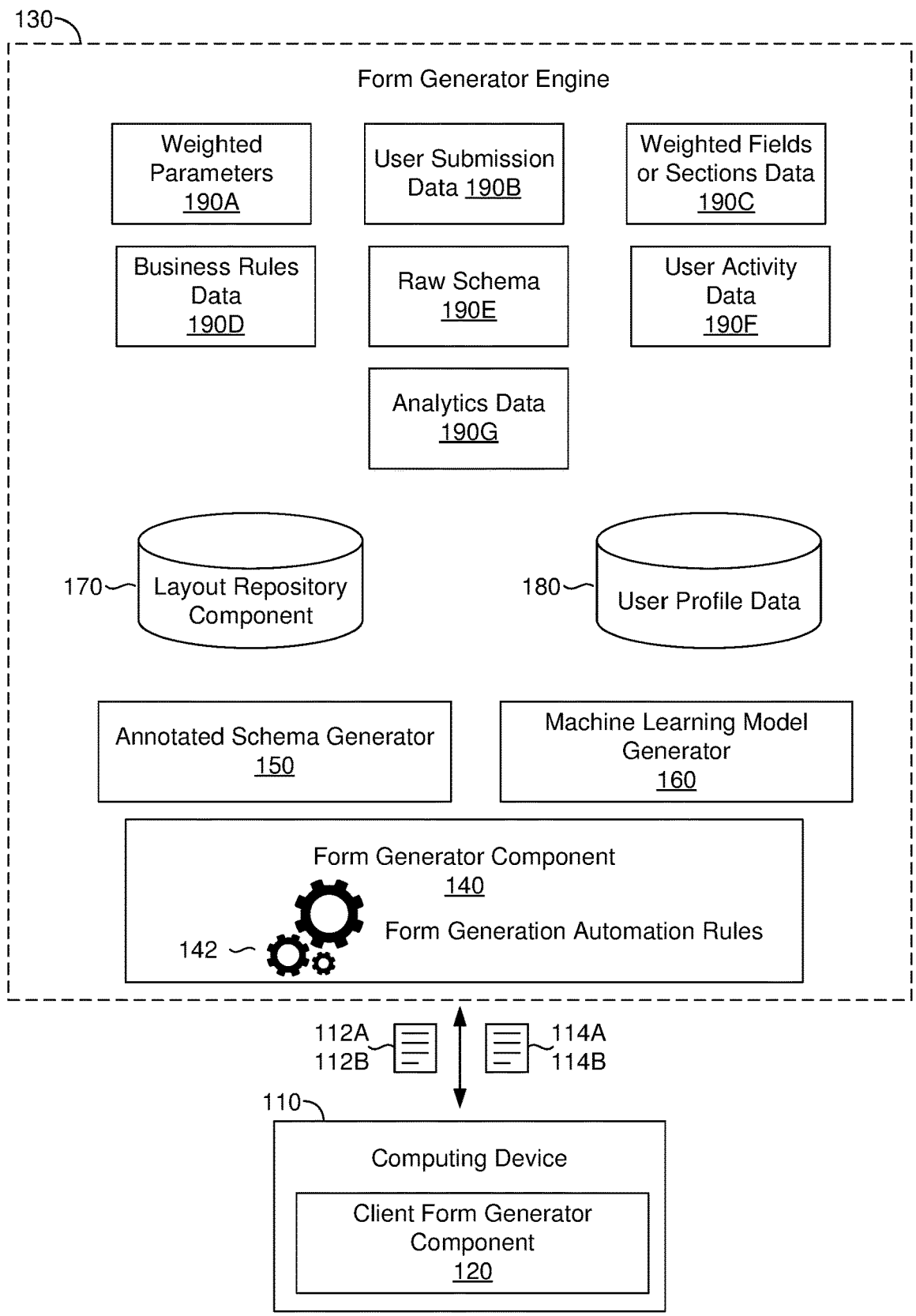
FIG. 2 a block diagram of an exemplary form generation system in which embodiments described herein may be employed.

Embodiments of the present invention can further be described with reference to FIG. 2, where FIG. 2 further illustrates components in the form generator engine 130. The form generator engine 130 further includes the form generator component 140 having a form generation automation rules 142, an annotated schema generator 150, a machine learning model generator 160, a layout repository component 170, user profile data 160, a plurality of additional form generator engine process components (i.e., weighted parameters 190A, user submission data 190B, weighted fields or sections data 190C, business rules data 190D, raw schema 190E, user activity data 190F, and analytic data 190G.) The form generator component 140 is configured to perform different types of operations to provide form generation system functionality described herein. The form generator component 140 uses schema annotation, machine learning models, and layout templates, in an integrated system, to automatically generate, combine and communicate forms. In this regard, the automated schema generator 150, the machine learning model generator 160 and the layout repository 170 support the functionality herein by providing schema annotation, machine learning models and layout templates.

The components are associated with generating, providing or accessing specific automation objects for the form. For example, an annotated schema generator 150 generates an annotated schema that includes fields or sections having annotated schema relevance scores. The annotated schema relevance score is based on corresponding weights of the fields or the sections, the annotated schema relevance score indicates a business value assessment based on business rules data. The annotated schema generator 150 generates the annotated schema based on a raw schema. In operation, a first set of fields or sections in the raw schema is annotated into a second set of fields or sections in the annotated schema using business rules data associated with a set of weights of the fields and sections, or validation data, or dependency data. The annotated schema generator 150 can also generate the annotated schema based on the raw schema, where the raw schema is annotated using user activity data and analytics data. The user activity data and analytics data are programmatically associated with the fields or sections. Annotating a first set of fields or sections in the raw schema into a second set of fields or sections supports defining an annotated relevance score for fields or sections in the annotated schema or selecting a layout template for forms.

The machine learning model generator 160 generates a machine learning model that is used to support automatically generating the form. The machine learning model generator 160 access the annotated schema from the annotated schema generator 150. The machine learning model generator 160 processes the annotated schema having fields or sections associated with weights (i.e., an annotated schema relevance score) and updates the fields and sections of the annotated schema with a machine learning relevance score. The machine learning relevance score indicates a quantified relevance of the fields and sections to an identified user and operates as a relevance score for generating and displaying fields and sections as part of forms. The machine learning model generator 160 also generates a machine learning model that supports identifying automated function values. An automated function value is a probable value for fields or sections of the form, the probable value is generated based on an annotated schema, user profile data and user submission data.

The layout repository component 170 and provides different layout templates. A layout includes multiple widgets, graphical controls and layout ordering features that support providing a data capture experience. The layout repository component 170 provides a plurality of layout templates, where the layout of the data capture experience can be dynamically generated or identified based on form generation parameters and user information (i.e., current session user inputs) to provide the user with a tailored experience. A selected layout template that is retrieved from the layout repository component 170 can be dynamically determined based on an annotated schema and the device type data. A display order in the layout template for fields or sections of the data capture is based on the corresponding relevance score. The layout repository component 170 can also receive updates from analytics data, such that the plurality of layout templates are associated with a layout relevance score corresponding to their conversion rate of users. Layout templates having high layout relevance score have a higher likelihood to be selected compared to other layouts templates that have lower layout relevance scores.

The form generator component 140 operates to access the form generation automation rules 142 and use the automation objects to generate the form. In particular, the form generator component 140 can access embedded rules (e.g., annotated form schema) or explicit rules (e.g., rules engine) that are scripted or coded to generate the form. For example, using processing the annotated form schema through the machine learning model, relevant sections above a relevance threshold can be selected to generate the form. Also, automated function values, identified based on the machine learning model, are presented as part of the form. The form generator component 140 can also further dynamically generates the form based on personalization and optimization, via one or more form generation iterations, based on current session user information. The current session user information can be used to determine how to present sections of the form to the user. For example, selecting a layout can be based, at least in part, on current session user information associated with the fields, or the relevance score for a section can be refined based on user activity or analytics. Based on user information received during a current session, form generation actions can be taken to dynamically update how the form is presented. The form is generated based on the form generation parameters and automation objects and communicated to the computing device. The user of the computing device can access a personalized, optimized and automatically generated form.

Figure 3:
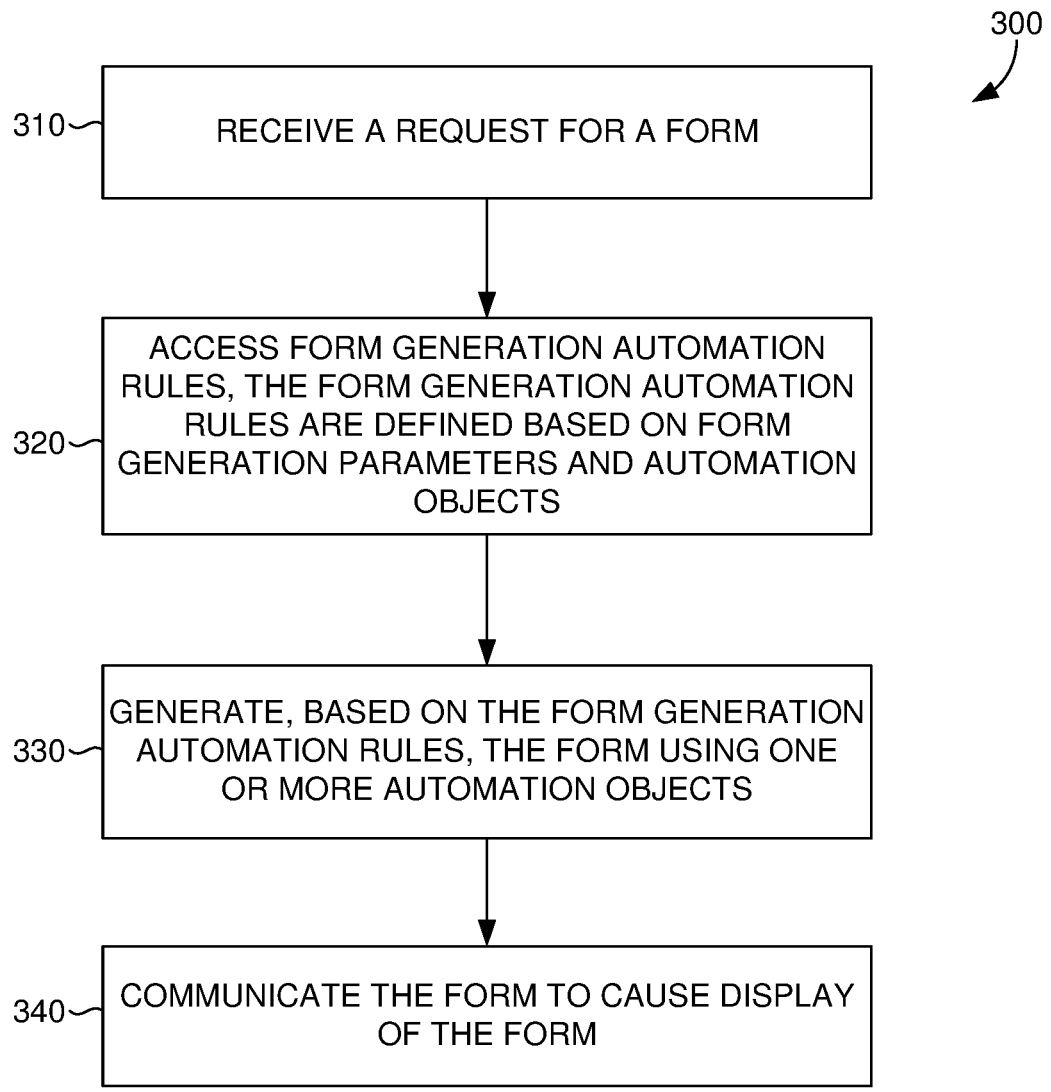
FIG. 3 is a flow diagram showing an exemplary method for implementing a form generation system, in accordance with embodiments described herein.
Figure 4:
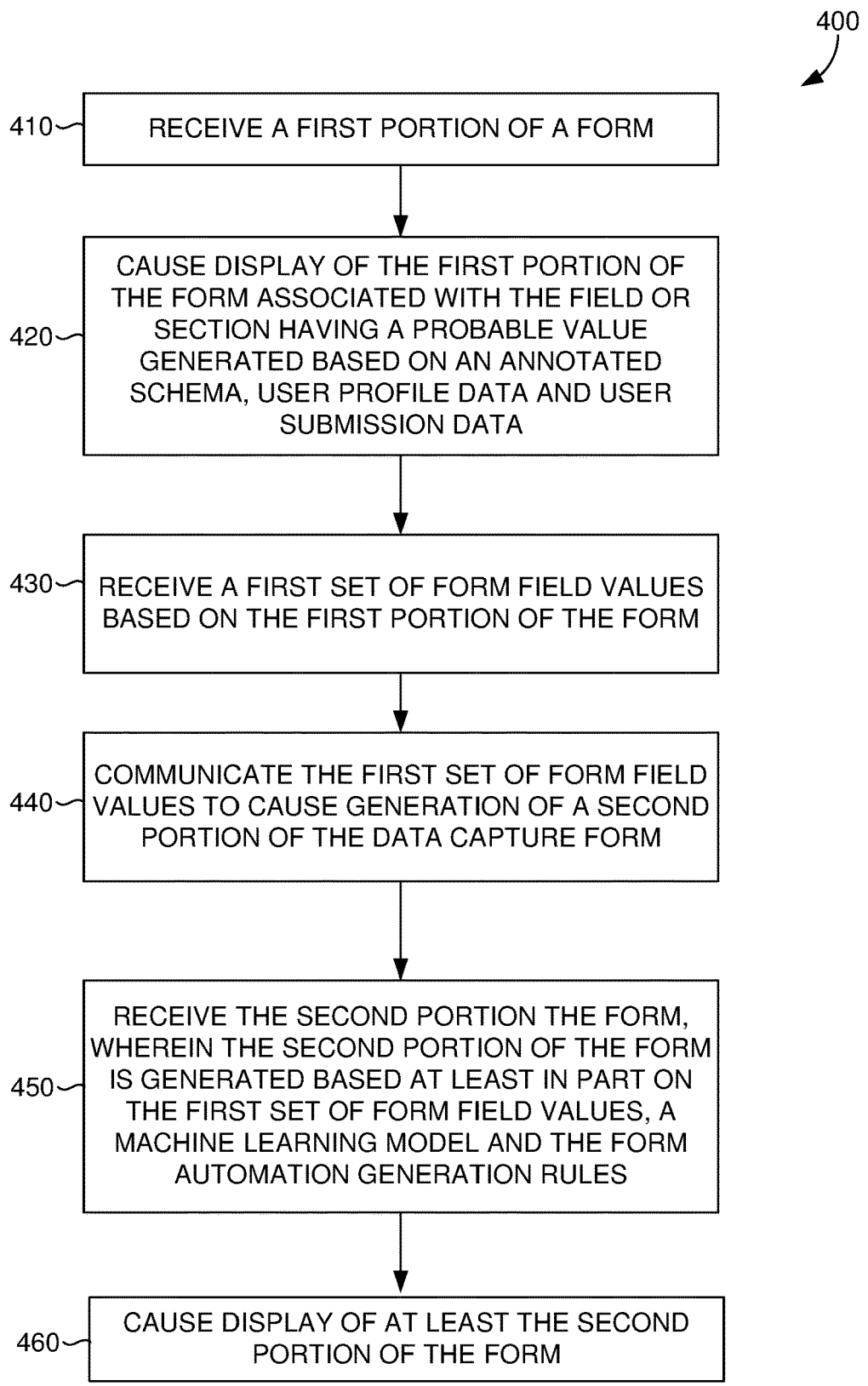
FIG. 4 is a flow diagram showing an exemplary method for implementing a form generation system, in accordance with embodiments described herein.
Figure 5:
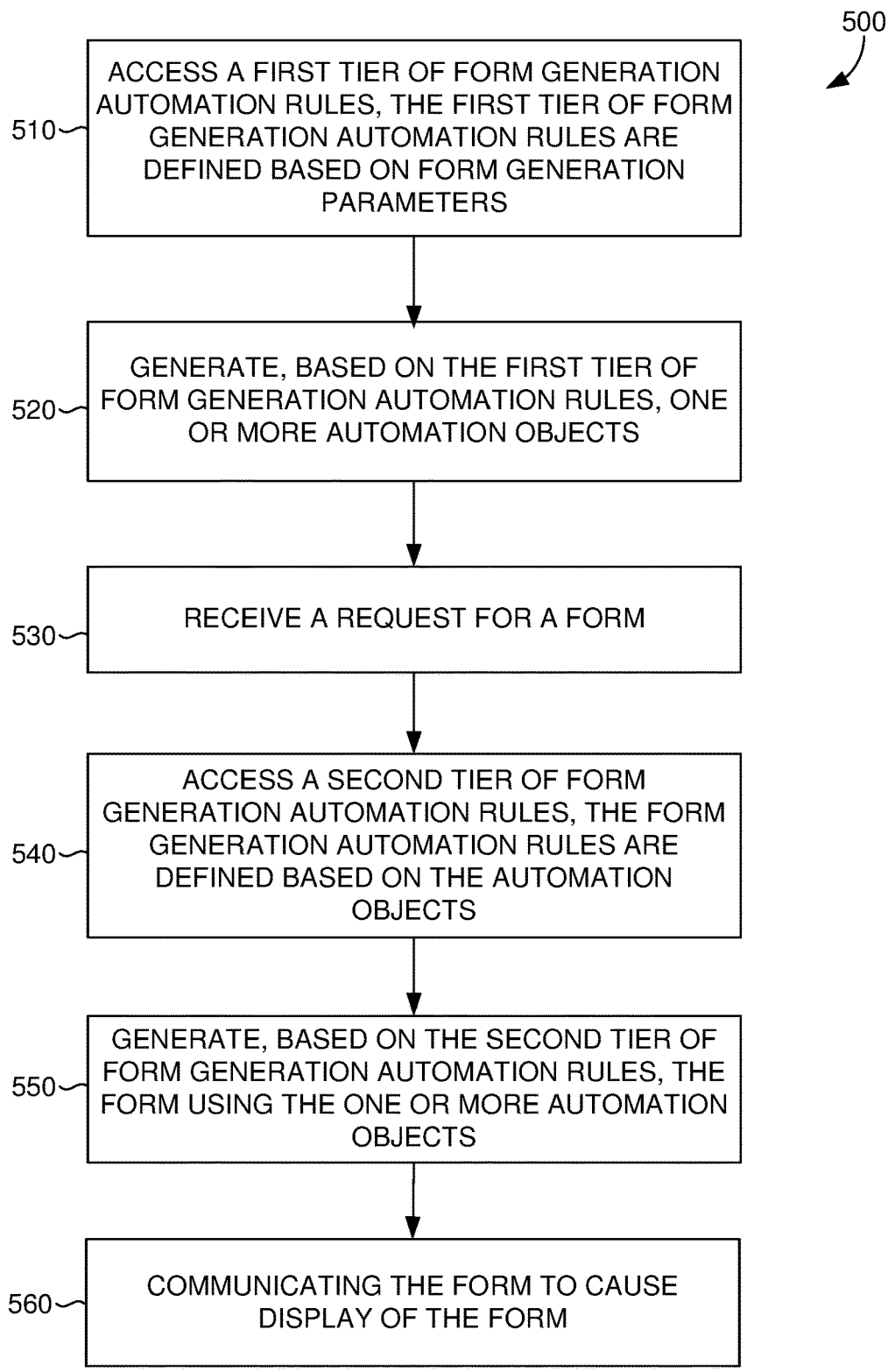
FIG. 5 is a flow diagram showing an exemplary method for implementing a form generation system, in accordance with embodiments described herein.

With reference to FIGS. 3, 4 and 5, flow diagrams are provided illustrating methods for implementing a form generation system. The methods can be performed using the form generation system described herein. In embodiments, one or more computer storage media having computer-executable instructions embodied thereon that, when executed, by one or more processors, can cause the one or more processors to perform the methods in the form generation system.

Turning to FIG. 3, a flow diagram is provided that illustrates a method 300 for implementing a form generation system. Initially at block 310, a request for a form is received. The request can be received with other form generation parameters (e.g., device type data). At block 320, form generation automation rules are accessed. The form generation automation rules are defined based on form generation parameters and form generation automation objects. Based on form generation automation rules, the form is generated using one or more automation objects. The one or more automation objects are utilized or accessed when generating a field or a section of the form based on a relevance score associated with the field or section. At block 340, the form is communicated to cause display of the form.

Turning to FIG. 4, a flow diagram is provided that illustrates a method 400 for implementing a form generation system. Initially at step 410, a first portion of a form is received. The first portion of the form is received in response to a request having one or more form generation parameters. The one or more form generation parameters comprises a device type data to receive the form, wherein based on the annotated schema and the device type data, a layout template can be dynamically determined for the first portion of the form.

The first portion of the form is generated using one or more automation objects and based on form generation automation rules defined based on form generation parameters and automation objects. The one or more automation objects include instructions to generate a field or section of the form associated with the field or section. At block 420, the first portion of the form is caused to be displayed. Causing display of the first portion of the form is based on the layout template that is dynamically selected can be based on a display order, in the layout template, for fields or sections of the form. The display order is based on a machine learning relevance score that indicates a quantified relevance of fields and sections of a form to an identified user. The machine learning relevance score operates as a relevance score for generating and displaying fields and sections as part of forms. The first portion can specifically have a probable value for fields or sections of the form, the probable value is generated based on an annotated schema, user profile data and user submission data.

At block 430, a first set of form field values is received based on the first portion of the form. At block 440, the first set of form field values is communicated to cause generation of a second portion of the form. At block 450, the second portion of the form is received. The second portion of the form is generated based at least in part on the first set form field values, a machine learning model and the form generation automation rules. At block 460, the second portion of the form is caused to be displayed. Causing display of the form (e.g., the first portion or the second portion) can also include causing display of one or more automated function values. An automated function value is a probable value for fields or sections of the form, the probable value is generated based on a machine learning model using an annotated scheme, user profile data, and user submission data.

Turning to FIG. 5, a flow diagram is provided that illustrates a method 500 for implementing a form generation system. Initially at step 510, a first tier of form generation automation rules is accessed. The first tier of form generation automation rules are defined based on form generation parameters. At block 520, one or more automation objects are generated based on the first tier of form generation automation rules. At block 530, a request for a form is received. At block 540, a second tier of form generation automation rules is accessed. The second tier of form generation automation rules are defined based on automation objects. At block 550, the form is generated, based on the second tier of form generation automation rules, using the one or more automation objects. The one or more automation objects comprising an annotated schema having instructions to generate a field or section of the form instructions to generate a layout of the form based on a selected layout template. At block 560, the form is communicated to cause display of the form.

With reference to the form generation system 100, embodiments described herein support dynamic generation, personalization, and optimization of the form. The form generation system components refer to integrated components that implement the image search system. The integrated components refer to the hardware architecture and software framework that support functionality using the form generation system components. The hardware architecture refers to physical components and interrelationships thereof and the software framework refers to software providing functionality that can be implemented with hardware operated on a device. The end-to-end software-based form generation system can operate within the other components to operate computer hardware to provide form generation system functionality. As such, the form generation system components can manage resources and provide services for the form generation system functionality. Any other variations and combinations thereof are contemplated with embodiments of the present invention.

By way of example, the form generation system can include an API library that includes specifications for routines, data structures, object classes, and variables may support the interaction the hardware architecture of the device and the software framework of the form generation system. These APIs include configuration specifications for the form generation system such that the components therein can communicate with each other for form generation, as described herein.

Having identified various component of the form generation system 100, it is noted that any number of components may be employed to achieve the desired functionality within the scope of the present disclosure. Although the various components of FIG. 1 are shown with lines for the sake of clarity, in reality, delineating various components is not so clear, and metaphorically, the lines may more accurately be grey or fuzzy. Further, although some components of FIG. 1 are depicted as single components, the depictions are exemplary in nature and in number and are not to be construed as limiting for all implementations of the present disclosure. The form generation system 100 functionality can be further described based on the functionality and features of the above-listed components.

Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

Figure 6:
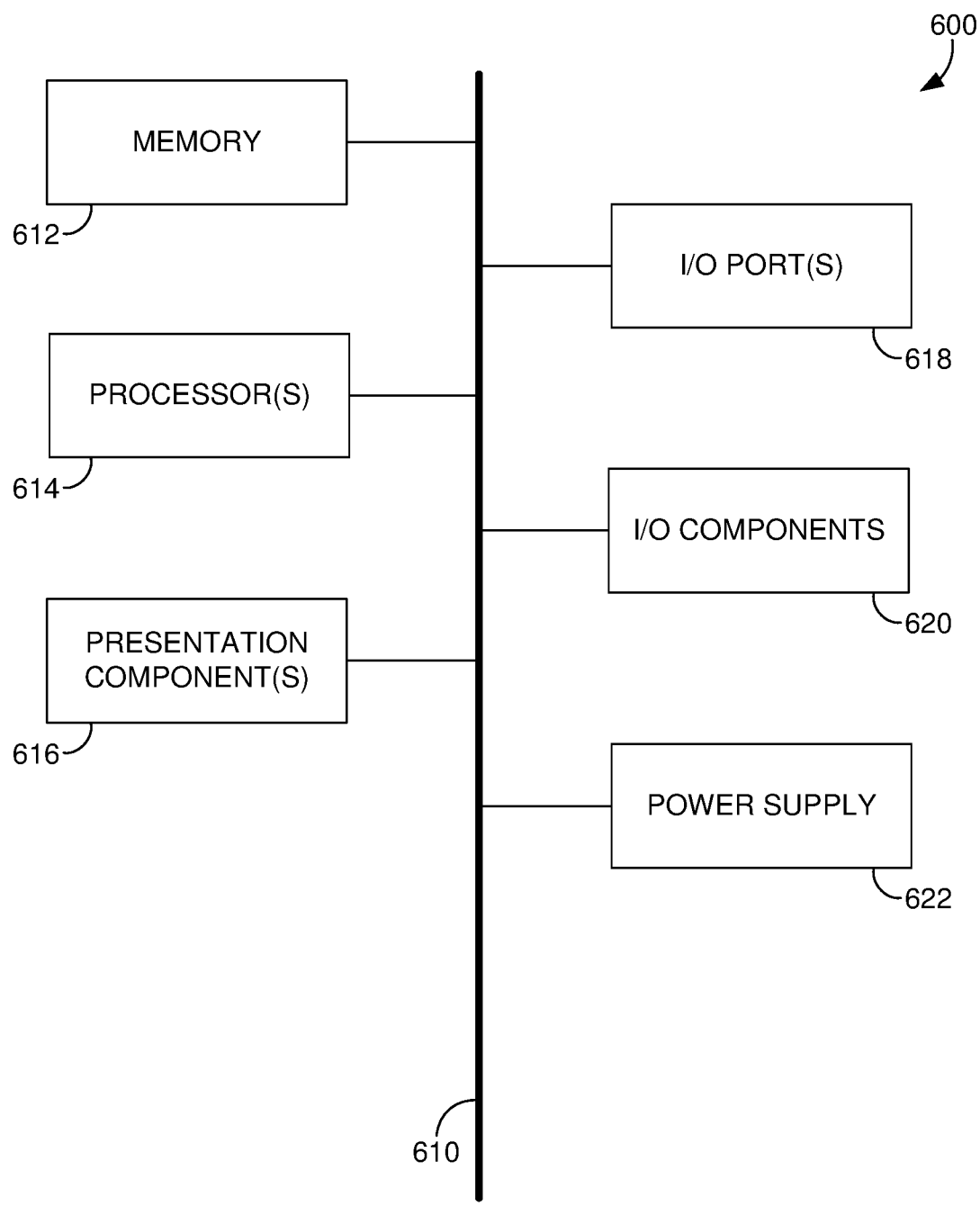
FIG. 6 is a block diagram of an exemplary computing environment suitable for use in implementing embodiments described herein.

Having briefly described an overview of embodiments of the present invention, an exemplary operating environment in which embodiments of the present invention may be implemented is described below in order to provide a general context for various aspects of the present invention. Referring initially to FIG. 6 in particular, an exemplary operating environment for implementing embodiments of the present invention is shown and designated generally as computing device 600. Computing device 600 is but one example of a suitable computing environment and is not intended to suggest any limitation as to the scope of use or functionality of the invention. Neither should the computing device 600 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc. refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 6, computing device 600 includes a bus 610 that directly or indirectly couples the following devices: memory 612, one or more processors 614, one or more presentation components 616, input/output ports 618, input/output components 620, and an illustrative power supply 622. Bus 610 represents what may be one or more busses (such as an address bus, data bus, or combination thereof). Although the various blocks of FIG. 6 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. We recognize that such is the nature of the art, and reiterate that the diagram of FIG. 6 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 6 and reference to "computing device."

Computing device 600 typically includes a variety of computer-readable media. Computer-readable media can be any available media that can be accessed by computing device 600 and includes both volatile and nonvolatile media, removable and non-removable media. By way of example, and not limitation, computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 600. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 612 includes computer storage media in the form of volatile and/or nonvolatile memory. The memory may be removable, non-removable, or a combination thereof. Exemplary hardware devices include solid-state memory, hard drives, optical-disc drives, etc. Computing device 600 includes one or more processors that read data from various entities such as memory 612 or I/O components 620. Presentation component(s) 616 present data indications to a user or other device. Exemplary presentation components include a display device, speaker, printing component, vibrating component, etc.

I/O ports 618 allow computing device 600 to be logically coupled to other devices including I/O components 620, some of which may be built in. Illustrative components include a microphone, joystick, game pad, satellite dish, scanner, printer, wireless device, etc.

Embodiments described in the paragraphs above may be combined with one or more of the specifically described alternatives. In particular, an embodiment that is claimed may contain a reference, in the alternative, to more than one other embodiment. The embodiment that is claimed may specify a further limitation of the subject matter claimed.

The subject matter of embodiments of the invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising," and the word "accessing" comprises "receiving," "referencing," or "retrieving." Further the word "communicating" has the same broad meaning as the word "receiving," or "transmitting" facilitated by software or hardware-based buses, receivers, or transmitters" using communication media described herein. Also, the word "initiating" has the same broad meaning as the word "executing or "instructing" where the corresponding action can be performed to completion or interrupted based on an occurrence of another action. In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of a detailed discussion above, embodiments of the present invention are described with reference to a distributed computing environment; however the distributed computing environment depicted herein is merely exemplary. Components can be configured for performing novel aspects of embodiments, where the term "configured for" can refer to "programmed to" perform particular tasks or implement particular abstract data types using code. Further, while embodiments of the present invention may generally refer to the distributed data object management system and the schematics described herein, it is understood that the techniques described may be extended to other implementation contexts.

Embodiments of the present invention have been described in relation to particular embodiments which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims.

The invention claimed is:

1. A computer-implemented method, the method comprising:
    accessing an annotation input for annotating a raw schema, wherein the raw schema comprises a first set of fields or sections;
    annotating the raw schema with the annotation input;
    based on annotating the raw schema with annotation input, generating an annotated schema comprising a second set of fields or sections; and communicating the annotated schema to a machine learning model that operates as an automation object associated with generating a form based on a request, the annotated schema operates with the machine learning model based on the machine learning model processing the annotated schema comprising the second set of fields or section to generate a relevance score associated with the second set of fields or sections, wherein the relevance score indicates a quantified relevance of the second set of fields or sections to an identified user, the quantified relevance supports generating and display fields and sections as part the form.

2. The method of claim 1, wherein the annotated schema includes the first set of fields or sections having an annotated schema relevance score based on corresponding weights of the first set of fields or the sections, wherein the annotated schema relevance score indicates a business value assessment based on business rules data.

3. The method of claim 1, wherein the annotated input associated with annotating the raw schema comprises one or more of the following: business rules data associated with a set of weights of the fields and sections, validation data, and dependency data.

4. The method of claim 1, wherein the raw schema is annotated using user activity data and analytics data that are programmatically associated with the first set of fields or sections, wherein annotating the first set of fields or sections in the raw schema into the second set of fields or sections supports selecting a layout template for forms.

5. The method of claim 1, wherein the machine learning model supports identifying one or more automated function values, wherein an automated function value is a probable value for the second set of fields or sections, wherein the probable value is generated based on the annotated schema, user profile data and user submission data.

6. The method of claim 1, the method further comprising receiving the request to generate the form for the user;
generating the form based on the annotated schema having the relevance score associated with the second set of fields or sections; and
communicating the form to cause display of the form.

7. The method of claim 6, the method further comprising:
accessing device type data associated with the request; and
dynamically determining a layout template from a plurality of layout templates based on the device type data, wherein causing display of the form is based on the layout template that is dynamically selected for the form, wherein a display order in the layout template for the second set of fields or sections of the form is based on corresponding relevance scores of the second set of fields or sections.

8. One or more hardware processors and computer storage media having computer-executable instructions embodied thereon that, when executed, by the one or more hardware processors, cause the one or more hardware processors to perform operations, the operations:
accessing an annotation input for annotating a raw schema, wherein the raw schema comprises a first set of fields or sections;
annotating the raw schema with the annotation input;
based on annotating the raw schema with annotation input, generating an annotated schema comprising a second set of fields or sections; and
communicating the annotated schema to a machine learning model that operates as an automation object associated with generating a form based on a request, the annotated schema operates with the machine learning model based on the machine learning model processing the annotated schema comprising the second set of fields or section to generate a relevance score associated with the second set of fields or sections, wherein the relevance score indicates a quantified relevance of the second set of fields or sections to an identified user, the quantified relevance supports generating and display fields and sections as part the form.

9. The media of claim 8, wherein the annotated schema include s the first set of fields or sections having an annotated schema relevance score based on corresponding weights of the first set of fields or the sections, wherein the annotated schema relevance score indicates a business value assessment based on business rules data.

10. The media of claim 8, wherein the annotated input associated with annotating the raw schema comprises one or more of the following: business rules data associated with a set of weights of the fields and sections, validation data, and dependency data.

11. The media of claim 8, wherein the raw schema is annotated using user activity data and analytics data that are programmatically associated with the fields or sections, wherein annotating the first set of fields or sections in the raw schema into the second set of fields or sections supports selecting a layout template for forms.

12. The media of claim 8, wherein the machine learning model supports identifying one or more automated function values, wherein an automated function value is a probable value for the second set of fields or sections, wherein the probable value is generated based on the annotated schema, user profile data and user submission data.

13. The media of claim 8, the operations further comprising:
receiving the request to generate the form for the user;
generating the form based on the annotated schema having the relevance score associated with the second set of fields or sections; and
communicating the form to cause display of the form.

14. The media of claim 13, the operations further comprising:
accessing device type data associated with the request; and
dynamically determining a layout template from a plurality of layout templates based on the device type data, wherein causing display of the form is based on the layout template that is dynamically selected for the form, wherein a display order in the layout template for the second set of fields or sections of the form is based on corresponding relevance scores of the second set of fields or sections.

15. A system, the system comprising:
one or more hardware computer processors; and
computer memory storing computer-useable instructions that, when used by the one or more hardware computer processors, cause the one or more hardware computer processors to perform operations comprising:
accessing an annotation input for annotating a raw schema, wherein the raw schema comprises a first set of fields or sections;
annotating the raw schema with the annotation input;
based on annotating the raw schema with annotation input, generating an annotated schema comprising a second set of fields or sections; and
communicating the annotated schema to a machine learning model that operates as an automation object associated with generating a form based on a request, the annotated schema operates with the machine learning model based on the machine learning model processing the annotated schema comprising the second set of fields or section to generate a relevance score associated with the second set of fields or sections, wherein the relevance score indicates a quantified relevance of the second set of fields or sections to an identified user, the quantified relevance supports generating and display fields and sections as part the form.

16. The system of claim 15, wherein the annotated schema includes the first set of fields or sections having an annotated schema relevance score based on corresponding weights of the first set of fields or the sections, wherein the annotated schema relevance score indicates a business value assessment based on business rules data.

17. The system of claim 15, wherein the annotated input associated with annotating the raw schema comprises one or more of the following: business rules data associated with a set of weights of the fields and sections, validation data, and dependency data.

18. The system of claim 15, wherein the raw schema is annotated using user activity data and analytics data that are programmatically associated with the fields or sections, wherein annotating the first set of fields or sections in the raw schema into the second set of fields or sections supports selecting a layout template for forms.

19. The system of claim 15, wherein the machine learning model supports identifying one or more automated function values, wherein an automated function value is a probable value for the second set of fields or sections, wherein the probable value is generated based on the annotated schema, user profile data and user submission data.

20. The system of claim 15, the operations further comprising:

receiving the request to generate the form for the user;

generating the form based on the annotated schema having the relevance score associated with the second set of fields or sections;

communicating the form to cause display of the form;

accessing device type data associated with the request; and dynamically determining a layout template from a plurality of layout templates based on the device type data, wherein causing display of the form is based on the layout template that is dynamically selected for the form, wherein a display order in the layout template for the second set of fields or sections of the form is based on corresponding relevance scores of the second set of fields or sections.

* * * * *